United States Patent
Fujita et al.

(10) Patent No.: US 12,478,001 B2
(45) Date of Patent: *Nov. 25, 2025

(54) PLANT ACTIVATOR CONTAINING AMINO ACID OR SALT THEREOF, AND OLIGOSACCHARIDE, AND USE THEREOF

(71) Applicant: SHOWA DENKO K.K., Tokyo (JP)

(72) Inventors: Ichiro Fujita, Tokyo (JP); Makoto Saito, Tokyo (JP); Hiroshi Uchida, Tokyo (JP); Hisashi Kimoto, Awara (JP)

(73) Assignee: Resonac Corporation, Tokyo (JP)

( * ) Notice: Subject to any disclaimer, the term of this patent is extended or adjusted under 35 U.S.C. 154(b) by 600 days.

This patent is subject to a terminal disclaimer.

(21) Appl. No.: 17/619,821

(22) PCT Filed: Jun. 15, 2020

(86) PCT No.: PCT/JP2020/097943
§ 371 (c)(1),
(2) Date: Dec. 16, 2021

(87) PCT Pub. No.: WO2020/255934
PCT Pub. Date: Dec. 24, 2020

(65) Prior Publication Data
US 2022/0369569 A1  Nov. 24, 2022

(30) Foreign Application Priority Data
Jun. 17, 2019 (JP) ................. 2019-112210

(51) Int. Cl.
*A01G 7/06* (2006.01)
*A01N 37/44* (2006.01)
*A01N 43/16* (2006.01)
*A01P 21/00* (2006.01)
*C08B 37/08* (2006.01)

(52) U.S. Cl.
CPC ............... *A01G 7/06* (2013.01); *A01N 43/16* (2013.01); *A01P 21/00* (2021.08); *C08B 37/003* (2013.01)

(58) Field of Classification Search
CPC .......... A01G 7/06; A01N 43/16; A01N 37/44; A01N 43/50; A01P 21/00; C08B 37/003; C05F 11/00; C05G 3/00
See application file for complete search history.

(56) References Cited

U.S. PATENT DOCUMENTS

| | | |
|---|---|---|
| 5,588,254 A | 12/1996 | Adachi et al. |
| 6,492,303 B1 | 12/2002 | Kawai et al. |
| 2009/0308122 A1* | 12/2009 | Shah ........... C05D 9/00 71/27 |
| 2018/0362669 A1 | 12/2018 | Fujita et al. |

FOREIGN PATENT DOCUMENTS

| | | | | |
|---|---|---|---|---|
| CN | 87107747 A | 6/1988 | | |
| CN | 1470168 A | 1/2004 | | |
| CN | 1733657 A | * 2/2006 | | |
| CN | 1792164 A | 6/2006 | | |
| CN | 101248796 A | 8/2008 | | |
| CN | 101376612 B | * 4/2011 | | |
| CN | 102267839 A | * 12/2011 | | |
| CN | 104692932 A | 6/2015 | | |
| DE | 3735365 A | * 4/1988 | ............. | A01N 43/16 |
| EP | 2 524 597 A1 | 11/2012 | | |
| JP | 63-215606 A | 9/1988 | | |
| JP | 09-143013 A | 6/1997 | | |
| JP | 2000-095609 A | 4/2000 | | |
| JP | 2001-017176 A | 1/2001 | | |
| JP | 2001-064112 A | 3/2001 | | |
| JP | 2002-144610 A | 5/2002 | | |
| JP | 2008-044854 A | 2/2008 | | |
| JP | 2012-010694 A | 1/2012 | | |
| JP | 2012-211124 A | 11/2012 | | |
| JP | 2013-151438 A | 8/2013 | | |
| JP | 2015-048436 A | 3/2015 | | |
| JP | 2017-095352 A | 6/2017 | | |
| JP | 2019-006774 A | 1/2019 | | |
| TW | 201524357 A | 7/2015 | | |
| WO | 2011/087002 A1 | 7/2011 | | |
| WO | 2012/046758 A1 | 4/2012 | | |
| WO | 2017/104687 A1 | 6/2017 | | |
| WO | WO-2019147660 A1 | * 8/2019 | | |

OTHER PUBLICATIONS

Zaini et al. (Journal of Functional Foods 20022;92:12 pages) (Year: 2022).*
Yin et al. (Frontiers in Plant Science 2016;7:4 pages) (Year: 2016).*
Reeves et al. (Ecology and Evolution 2023;13:e10348;14 pages) (Year: 2023).*
Inui et al. (Biosci. Biotch. Biochem. 1997;61(6):975-978). (Year: 1997).*
International Search Report for PCT/JP2020/023472 dated Sep. 8, 2020 [PCT/ISA/210].
Written Opinion for PCT/JP2020/023472 dated Sep. 8, 2020 [PCT/ISA/237].
Decision of Final Rejection issued Jan. 9, 2024 in JP Application No. 2021-528238.
Applied Glycoscience, 2014, vol. 4, No. 2, pp. 127-132 (7 pages total).
New Experimental Chemistry Seminar 20, Biochemistry II, 1978, p. 1101 (3 pages total).

(Continued)

*Primary Examiner* — Ernst V Arnold

(74) *Attorney, Agent, or Firm* — Sughrue Mion, PLLC

(57) ABSTRACT

Physiological processes in plants are regulated and reinforced, and crop vitality, yield, quality and post-harvesting storage life are improved. A plant vitalizer containing an amino acid or its salt and an oligosaccharide is applied to plants.

14 Claims, No Drawings

(56) References Cited

OTHER PUBLICATIONS

Camila Ramos Santos, et al., Molecular Mechanisms Associated with Xylan Degradation by Xanthomonas Plant Pathogens, The Journal of Biological Chemistry, Nov. 14, 2014, vol. 289, No. 46., pp. 32186-32200 (16 pages).

Sreynich Pring et al., "Induction of plant disease resistance by mixed oligosaccharide elicitors prepared from plant cell wall and crustacean shells", 2023, Physiologia Plantarum, vol. 175, No. 5, pp. 1-15 (16 pages).

Clarice de Azevedo Souza et al: "Cellulose-Derived Oligomers Act as Damage-Associated Molecular Patterns and Trigger Defense-Like Responses", Plant Physiology, vol. 173, No. 4, Feb. 27, 2017, pp. 2383-2398 (16 pages).

\* cited by examiner

PLANT ACTIVATOR CONTAINING AMINO ACID OR SALT THEREOF, AND OLIGOSACCHARIDE, AND USE THEREOF

CROSS REFERENCE TO RELATED APPLICATIONS

This application is a National Stage of International Application No. PCT/JP2020/023472 filed Jun. 15, 2020, claiming priority based on Japanese Patent Application No. 2019-112210 filed Jun. 17, 2019.

FIELD

The present invention relates to a plant vitalizer comprising an amino acid or its salt and an oligosaccharide, and to method of cultivating and producing plants using the plant vitalizer.

BACKGROUND

Plants suffer reduction in yields due to abiotic stress due to daylight hours, atmospheric temperature and rainfall, and biological stress such as pests. Various types of fertilizers and agricultural chemicals have been used in the prior art to increase yields, especially of agricultural crops. Fertilizers are nutrients that are required for plant growth, but they lack functions for alleviating stress. Agricultural chemicals directly eliminate pests that parasitize plants and thus eliminate biological stress, but the safety of using agricultural chemicals has not been adequately confirmed, and concerns remain regarding the effects of their excess consumption on the human body and on the environment, while chemical agents such as agricultural chemicals produced by chemical synthesis methods are especially concerning in terms of their dispersion and residence for long periods in soil, and consequently other methods are desired to provide resistance against biological stress. The use of biostimulants has also been a subject of interest in recent years, since they are substances that are safe for the human body and the environment.

The term "biostimulant", sometimes synonymous with "plant vitalizer", refers to a component that contains a substance group or microorganism and, when applied to the plant body or its root system, stimulates the series of processes that take place in the plant body in its natural state, thereby improving nutrient absorption, increasing fertilization efficiency, providing stress resistance and improving quality, while not having a direct effect against pests so that it is not classified as an insecticide or microbicide. In other words, it is a component found in the natural world (including microorganisms), as a substance which is not a plant hormone or nutrient but, even in small amounts, stimulates plant activity and promotes growth. Applying a biostimulant to a plant increases nutrient absorption and nutrient utilization in the plant, promoting its growth and improving the yield and quality of crops. Agricultural biostimulants include various formulations such as compounds, substances or other products that act on plants or soil to regulate and reinforce physiological processes in crops. Biostimulants act on plant physiology by a different route than that of nutrients to improve crop vitality, yield, quality and post-harvesting storage life.

Biostimulants can therefore stimulate the innate abilities of plants and promote their growth without causing problems associated with conventional agricultural chemicals or fertilizers.

Previous publications related to such biostimulants have contained descriptions of: plant vitalizers that combine chitin oligosaccharides with chitosan which has antimicrobial activity (PTL 1), plant vitalizers combining oligosaccharides and plant extract components in vinegar (PTL 2), plant growth accelerators that include cellulose (PTL 3), plant growth regulators that include hexofuranose derivatives (PTL 4), a method of increasing plant disease resistance using low molecularized chitin or chitosan (PTL 5), fertilizers containing chitin and/or chitosan (PTL 6), and plant growth promoters containing glutamic acid and proline as constituent amino acids (PTL 7).

CITATION LIST

Patent Literature

[PTL 1] Japanese Unexamined Patent Publication HEI No. 9-143013
[PTL 2] Japanese Unexamined Patent Publication No. 2001-64112
[PTL 3] Japanese Unexamined Patent Publication No. 2002-114610
[PTL 4] Japanese Unexamined Patent Publication No. 2013-151438
[PTL 5] Japanese Unexamined Patent Publication No. 2015-48436
[PTL 6] Japanese Unexamined Patent Publication No. 2017-95352
[PTL 7] Japanese Unexamined Patent Publication No. 2019-006774
[PTL 8] International Patent Publication No. 2017/104687

SUMMARY

Technical Problem

The problem to be solved by the invention is to regulate and reinforce physiological processes in plants, and improve crop vitality, yield, quality and post-harvesting storage life.

Solution to Problem

As a result of diligent research and experimentation with the aim of solving this problem, the present inventors have completed this invention upon finding, surprisingly, that a combination of an amino acid or its salt with an oligosaccharide promotes plant growth and increases elicitor activity for the plant.

Specifically, the present invention provides the following.
[1] A plant vitalizer comprising an amino acid or its salt and an oligosaccharide.
[2] The plant vitalizer according to [1], wherein the oligosaccharide is at least one type of oligosaccharide selected from the group consisting of chitin oligosaccharides, cellooligosaccharides and xylooligosaccharides.
[3] The plant vitalizer according to [1] or [2], comprising all the three types of chitin oligosaccharide, cellooligosaccharide and xylooligosaccharide as oligosaccharides.
[4] The plant vitalizer according to any one of [1] to [3], wherein the amino acid is at least one selected from the group consisting of glycine, glutamic acid and histidine.
[5] The plant vitalizer according to any one of [1] to [4], wherein the amino acid is glycine.

[6] The plant vitalizer according to any one of [1] to [5], wherein the total content of the oligosaccharides in the plant vitalizer is 0.05 to 10 mass %.

[7] The plant vitalizer according to any one of [1] to [6], wherein the total content of the amino acid or its salt in the plant vitalizer is 2.5 to 30 mass %.

[8] The plant vitalizer according to any one of [1] to [7], which further comprises a spreading agent.

[9] A plant cultivation method, which comprises applying a plant vitalizer according to any one of [1] to [8] to a plant.

[10] The method according to [9], which comprises applying the plant vitalizer to a plant at a concentration so that the total content of the oligosaccharide is 0.1 to 500 ppm by mass.

[11] The method according to [9] or [10], wherein the plant vitalizer is applied to the plant by foliar application.

[12] A method of producing a plant or a part thereof having increased elicitor activity compared to the same without application of a plant vitalizer according to any one of [1] to [8], wherein the method comprises cultivating the plant by the method according to any one of [9] to [11].

[13] The method according to [12], wherein the elicitor activity is determined by measuring glucanase production in the plant.

[14] A fertilizer composition comprising a plant vitalizer according to any one of [1] to [8].

Advantageous Effects of Invention

According to the invention it is possible to regulate and reinforce physiological processes in plants without causing problems such as effects on the human body or environment as are caused by conventional agricultural chemicals or fertilizers, and to improve crop vitality, yield, quality and post-harvesting storage life.

DESCRIPTION OF EMBODIMENTS

According to a first aspect of the invention there is provided a plant vitalizer comprising an amino acid or its salt and an oligosaccharide.

The term "plant vitalizer" according to the invention includes not only substances that have effects of alleviating abiotic stresses such as temperature, light, water and salts that are involved in the growth of plants, but also effects of alleviating biological stresses such as pests.

The oligosaccharide to be used for the invention is preferably at least one selected from the group consisting of chitin oligosaccharides, cellooligosaccharides and xylooligosaccharides. The plant vitalizer of the invention more preferably contains two or more selected from the group consisting of chitin oligosaccharides, cellooligosaccharides and xylooligosaccharides, and even more preferably it contains all the three types of chitin oligosaccharide, cellooligosaccharide and xylooligosaccharide, as oligosaccharides.

According to the invention, the chitin oligosaccharide is used as an elicitor which is a component from organisms other than plants, such as fungi, insects or crustaceans (i.e. "exogenous elicitor"), and the cellooligosaccharide and xylooligosaccharide are used as plant-derived elicitors (i.e. "endogenous elicitors").

The term "elicitor" generally refers to a substance that induces a biological defense reaction in a higher plant tissue or cultured cells, whereby it induces disease resistance by plant immunomechanisms. Plants are sensitive to elicitors by receptors present on leaf surfaces, initiating pathogen resistance reactions. This induces biological defense activity (immunity) in which various compounds are secreted against different pathogenic organisms. When an elicitor acts on a plant, it induces defense reactions such as synthesis and accumulation of phytoalexins and infection-specific proteins, production of active oxygen species, production of active nitrogen species, hypersensitive reactive cell death, and changes in gene expression, these reactions being thought to protect the plant from pathogenic organisms and increase disease resistance.

Phytoalexins are antimicrobial compounds synthesized and accumulated in the plant body due to action of elicitors, and the antimicrobial compounds produced differ depending on the plant variety. Typical phytoalexins include flavonoids, terpenoids and fatty acid derivatives. Active oxygen species have activity that kills pathogenic microorganisms, while active oxygen and active nitrogen species, either alone or in coordination, function as signals to initiate various defense reactions. The disease resistance provided by such elicitor effects helps to augment resistance against a wide range of diseases, and it is therefore expected to be useful for agriculture.

Chitin oligosaccharides contain partially deacetylated chitosan oligosaccharides, being oligosaccharides with several N-acetylglucosamines linked together, which can generally be obtained by hydrolysis of crustacean-derived chitins. These are commonly known as oligo-N-acetylglucosamines.

Specifically, chitin oligosaccharides are obtained by chemical or enzymatic partial hydrolysis of chitin prepared by a common method from shells of crustaceans such as crab or shrimp. A chitin oligosaccharide that is used is preferably one or a mixture of more than one selected from among N-acetylchitobiose, N-acetylchitotriose, N-acetylchitotetraose, N-acetylchitopentaose, N-acetylchitohexaose, N-acetylchitoheptaose and N-acetylchitooctaose. Among these, N-acetylchitopentaose, N-acetylchitohexaose and N-acetylchitoheptaose have particularly high elicitor effects.

Chitin oligosaccharides to be used for the invention are most preferably ones having the following chemical structure.

[Chemical Formula 1]

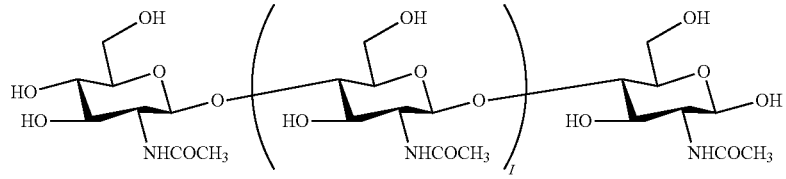

$l = 0-6$

These include compounds wherein some of the acetyl groups ($COCH_3$) are shed, leaving $NH_2$ groups. The percentage of deacetylation is preferably no greater than 30%, more preferably no greater than 20% and even more preferably no greater than 15% of the total chitin oligosaccharide.

Cellooligosaccharides are oligosaccharides polymerized by β-glycoside bonding of multiple glucose molecules, and in recent years they have been found to have functionality including moisture retention, stickiness inhibition, freshness functionality, starch aging reduction and protein denaturation inhibition, for which they are expected to have uses in the fields of medicine, cosmetics, foods and feed. In particular, cellooligosaccharides with a glucose polymerization degree of 3 or greater are even more promising in terms of increasing the functionality mentioned above and also providing new functionality. The cellooligosaccharides currently used in industry are produced by enzyme reaction, but their main components are glucose and dimeric cellobioses, whereas they contain almost no trimeric cellotriose or greater oligomers. In recent years, however, the present applicants have reported a method for producing cellooligosaccharides that comprise oligomers with a glucose polymerization degree of 3 to 6, in hydrolysis reaction of vegetable biomass using a carbon catalyst, by carrying out hydrothermal reaction while controlling the temperature-elevating rate, cooling rate, reaction temperature and reaction time (PTL 8).

When a cellooligosaccharide is to be obtained by hydrolysis of cellulose, it is preferred to use crystalline fine powdered cellulose such as AVICEL (product of Merck), or cotton linter pulp, as the cellulose starting material.

Cellooligosaccharides to be used for the invention are most preferably ones having the following chemical structure.

When the plant vitalizer contains only the two types of chitin oligosaccharide and xylooligosaccharide as oligosaccharides, the mass ratio of the contents of the chitin oligosaccharide and xylooligosaccharide is preferably chitin oligosaccharide:xylooligosaccharide=1:1 to 1:5, and more preferably chitin oligosaccharide:xylooligosaccharide=1:1.5 to 1:4.

When the plant vitalizer contains only the two types of chitin oligosaccharide and cellooligosaccharide as oligosaccharides, the mass ratio of the contents of the chitin oligosaccharide and cellooligosaccharide is preferably chitin oligosaccharide:cellooligosaccharide=1:1 to 1:5, and more preferably chitin oligosaccharide:cellooligosaccharide=1:1.5 to 1:4.

When the plant vitalizer contains the three types of chitin oligosaccharide, cellooligosaccharide and xylooligosaccharide as oligosaccharides, the percentage of each oligosaccharide with respect to the total content of the chitin oligosaccharide, cellooligosaccharide and xylooligosaccharide is preferably 10 to 50 mass % of the chitin oligosaccharide, 10 to 50 mass % of the cellooligosaccharide and 10 to 60 mass % of the xylooligosaccharide. The percentage of each oligosaccharide is more preferably 20 to 40 mass % of the chitin oligosaccharide, 20 to 40 mass % of the cellooligosaccharide and 20 to 55 mass % of the xylooligosaccharide.

The amino acid used for the invention is preferably at least one selected from the group consisting of glycine, glutamic acid and histidine, and more preferably glycine.

An amino acid salt used for the invention is not particularly restricted, and may be a sodium salt or potassium salt of an amino acid, for example. Sodium glutamate is a specific example of an amino acid salt.

The plant vitalizer of the invention may be prepared as a product in any form such as powder, granules or liquid, but it is generally preferred to be in easily dispersible liquid

[Chemical Formula 2]

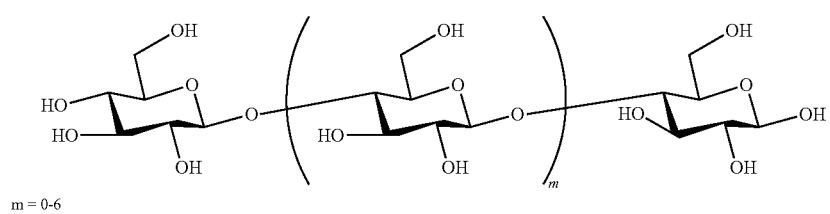

m = 0-6

Xylooligosaccharides are oligosaccharides polymerized by β-glycoside bonding of multiple xylose molecules, and they are generally obtained by hydrolysis of xylan as the main component of hemicellulose, being marketed mainly for comestible purposes.

Xylooligosaccharides to be used for the invention are most preferably ones having the following chemical structure.

[Chemical Formula 3]

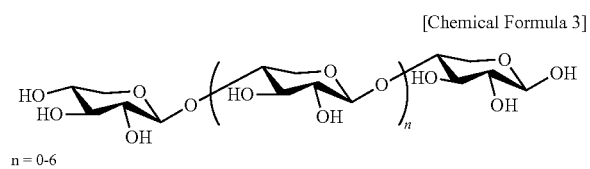

n = 0-6 form. The plant vitalizer of the invention can be supplied as a stock solution comprising the amino acid or its salt and the oligosaccharide dissolved at high concentration in a solvent such as water. As one embodiment, the total content of the oligosaccharide in the plant vitalizer stock solution is preferably 0.05 to 10 mass %, more preferably 0.1 to 8 mass % and even more preferably 0.5 to 6 mass %. As another embodiment, the total content of the oligosaccharide in the plant vitalizer stock solution is preferably 1 to 15 mass %, more preferably 3 to 12 mass % and even more preferably 5 to 10 mass %.

As one embodiment, the total content of the amino acid or its salt in the stock solution of the plant vitalizer of the invention is preferably 2.5 to 30 mass %, more preferably 5 to 20 mass % and even more preferably 9 to 16 mass %. As another embodiment, the total content of the amino acid or its salt is preferably 10 to 70 mass %, more preferably 15 to 60 mass % and even more preferably 20 to 50 mass %.

The plant vitalizer of the invention may also contain components other than an amino acid or its salt and an oligosaccharide as active components, such as antiseptic agents, spreading agents, anti-settling agents, thickeners and fillers. Antiseptic agents include potassium sorbate, paraoxybenzoic acid esters, benzoin, sodium dehydroacetate, hinokitiol, phenoxyethanol, polyaminopropyl biguanide and polylysine. Spreading agents are viscous liquids composed mainly of surfactants, and they are not particularly restricted so long as they can be used as spreading agents for plant vitalizers, examples including polyoxyethylene nonylphenyl ethers, sorbitan fatty acid esters and polyoxyethylene hexitan fatty acid esters. Anti-settling agents include polyphosphoric acid and polyphosphoric acid salts, or polycarboxylic acid-type polymer surfactants. Thickeners include carboxymethyl cellulose (CMC), polyacrylamide, water-soluble polymers such as starch, or molasses, alcohol fermentation concentrate waste liquids and amino acid fermentation concentrate waste liquids. Fillers include lactose and starch.

According to a second aspect of the invention there is provided a plant cultivation method that comprises applying a plant vitalizer of the invention to a plant.

Plants to which a plant vitalizer of the invention is to be applied are not particularly restricted but will typically be crops, such as plants of the family Compositae, Solanaceae, Brassicaceae, Poaceae, Leguminosae, Rosaceae, Cucurbitaceae, Convolvulaceae, Chenopodiaceae, Liliaceae, Umbelliferae, Malvaceae, Zingiberaceae or Nelumbonaceae.

Specifically, these include Brassicaceae plants such as Chinese cabbage, cabbage, broccoli, cauliflower, komatsuna, mizuna, Japanese radish and turnip, Solanaceae plants such as potato, tomato, eggplant, bell pepper, capsicum, shishito and tobacco, Compositae plants such as crowndaisy, lettuce, leaf lettuce, burdock and butterbur, Cucurbitaceae plants such as watermelon, melon, pumpkin, cucumber, nigauri, loofah and gourd, Chenopodiaceae plants such as spinach, chard, Swiss chard, okahijiki and beet, Umbelliferae plants such as *ginseng*, celery, parsley and mitsuba, Leguminosae plants such as soybean (green soybean), adzuki bean, green bean, horse-bean, pea, winged-bean and peanut, Convolvulaceae plants such as sweet potato and water spinach, Liliaceae plants such as Chinese chive, Welsh onion, onion, garlic and asparagus, Rosaceae plants such as strawberry, apple, pear and loquat, Malvaceae plants such as okra and cotton, Zingiberaceae plants such as ginger, Nelumbonaceae plants such as lotus, and Poaceae plants such as corn, rice, barley, wheat and sugarcane.

Of these, Brassicaceae plants such as cabbage and komatsuna, Solanaceae plants such as tomato and eggplant, Compositae plants such as lettuce and leaf lettuce and Rosaceae plants such as strawberry and apple are preferred, with komatsuna and tomato being more preferred.

The plant vitalizer of the invention will generally be used after dilution to a desired concentration (such as 1000-fold dilution) by addition of water or the like to the stock solution, and applied to a plant at a concentration so that the total content of the oligosaccharides in the plant vitalizer is preferably 0.1 to 500 ppm by mass. It may also be applied to a plant in a concentration so that the total content of oligosaccharides in the plant vitalizer is preferably 0.5 to 200 ppm by mass and more preferably 1 to 100 ppm by mass.

Application of the plant vitalizer to a plant may be by any method commonly used by those skilled in the art without any particular restriction on the dispersion method, examples including a method of direct dispersion onto the leaves or stems of the plant, a method of dispersion into culture medium or soil in which the plant is to be cultivated, or a method of mixing into fertilizer and then dispersion into culture medium or soil. For mixing into fertilizer, the type of fertilizer is not restricted and may be chemical fertilizer comprising nitrogen, phosphoric acid and potassium, or organic fertilizer containing oil residue, fish residue, bone powder, sea weed powder, saccharides or vitamins. The dispersion method is most preferably carried out by foliar application, as this will allow the elicitor activity to be effectively exhibited. Foliar application may be carried out by a method commonly known to those skilled in the art, using a mechanical power atomizer, shoulder atomizer, broadcaster, sprayer, manned or unmanned helicopter, duster or hand sprayer.

When the plant vitalizer is to be dispersed after mixing with a fertilizer, the content of the oligosaccharide is preferably 10 to 50 mass % and more preferably 15 to 40 mass %, with respect to 100% solid mass of the fertilizer composition. The content of the amino acid or its salt is preferably 10 to 50 mass % and more preferably 15 to 40 mass %, with respect to 100% solid mass of the fertilizer composition. The fertilizer composition more preferably also comprises at least one nutrient selected from among nitrogen, phosphoric acid and potassium, and more preferably comprises all three nutrients nitrogen, phosphoric acid and potassium, in addition to the oligosaccharide and amino acid or its salt. In the case of a liquid fertilizer, the fertilizer composition contains water at preferably 70 to 99 mass % and more preferably 75 to 99 mass %, and preferably the stock solution is diluted 100-fold to 1000-fold before dispersion.

By cultivating the plant using this method, it is possible to produce a plant or a part thereof (for example, root, stem, leaf, flower, fruit, seed, tissue or cells) having elicitor activity compared to the same without application of a plant vitalizer, and to thus improve crop vitality, yield, quality and post-harvesting storage life.

As mentioned above, the elicitor effect is important as one index of disease resistance, but the present inventors have found that the elicitor activity can be evaluated based on glucanase production, as a signal of the elicitor effect, by measuring its enzyme activity. A portion of the leaves of a plant being cultivated may be harvested to analyze the glucanase activity, allowing periodic evaluation of the same individual.

The following is a summary of the procedure for a method of evaluating elicitor activity:

(i) The plant is sampled and pretreated; (ii) a calibration curve is drawn using BSA as the protein standard (using absorbance at a wavelength (600 nm) in a dye binding method); (iii) the protein concentration of the specimen prepared in (i) is measured; (iv) the glucanase activity of the specimen prepared in (i) is measured. Specifically, the activity is evaluated as the absorbance value at a wavelength of 590 nm, using a B-HS reagent that exhibits color when soluble low molecular decomposition products are freed by glucanase; and (v) the glucanase activity is calculated in terms of protein units.

The specific procedure for evaluation of the elicitor activity is explained in detail below in the Examples.

These Examples serve merely for concrete illustration of the invention and are not intended to be limitative on the invention.

EXAMPLES

[1. Preparation of Oligosaccharides]
(1) Chitin Oligosaccharide

A 10 g portion of chitin (purified chitin by FujiFilm-Wako Pure Chemical Industries) was dispersed in 30 mL of water containing 1.2 g of phosphoric acid, the powder that had been dried under reduced pressure was placed in a 250 mL-volume alumina pot together with 100 g of alumina balls with diameters of 5 mm, and then this was set in a planetary ball mill (PULVERISETTE6 by Fritsch Co.) and treatment was carried out continuously for 6 hours at 500 rpm to obtain a reaction product. The temperature was initially room temperature, and temperature increase was allowed to proceed by shear heat release.

The reaction product was then suspended in water, and after neutralizing with calcium hydroxide, the resulting slurry solution was filtered with a Nutsche filter using 5B filter paper, and the recovered filtrate was freeze-dried to obtain the chitin oligosaccharide powder.

(2) Cellooligosaccharide

The cellooligosaccharide produced by "Production method 1" was used in Examples 1 and 2 and Comparative Examples 1 and 4, and the cellooligosaccharide produced by "Production method 2" was used in Examples 6, 8 and 10.

(Production Method 1: From Crystalline Fine Powder Cellulose)

A 10 g portion of AVICEL (crystalline fine powder cellulose by Merck) and 1.5 g of BA50 active carbon (product of Ajinomoto Fine-Techno Co. Inc.) were placed in a 3600 mL-volume ceramic pot mill together with 2000 g of alumina spheres with diameters of 1.5 cm, and this was set in a desktop pot mill rotating table (ANZ-51S Desktop Pot Mill by Nitto Kagaku Co., Ltd.), carrying out treatment for 48 hours at 60 rpm to obtain a reaction starting material. The temperature was initially room temperature, and temperature increase was allowed to proceed by shear heat release.

Next, 0.374 g of the reaction starting material and 40 mL of water were placed in a high pressure reactor (100 mL internal volume, autoclave by OM Labotech Co., hastelloy C22), after which it was heated to a reaction temperature of 230° C. at 10 to 30° C./min (average temperature-elevating rate: 11.3° C./min) while stirring at 600 rpm, the heating was abruptly stopped, and the reactor was air-cooled at 10 to 30° C./min (average temperature-lowering rate: 16.7° C./min) to prepare a reaction mixture.

Supernatant recovered from the reaction mixture using a centrifuge apparatus was then freeze-dried to obtain cellooligosaccharide powder.

(Production Method 2: From Cotton Linter Pulp)

A 271 g portion (1.8% water content, 266 g dry mass) of cotton linter pulp (cellulose content: 97%, Tokokosen Corp.) was mixed with 38 g of 85 mass % phosphoric acid (special grade reagent, product of FujiFilm-Wako Pure Chemical Industries) using a food blender (Model: HBF500S by Hamilton Beach Co.), to obtain 309 g of a reaction starting material (3.4% water content, phosphoric acid content: 10.4%).

Next, the 309 g of reaction starting material was loaded into a vibrating mill (device name: MB-1, product of Chuo Kakohki Co., Ltd., 5 L pot size), together with 13 kg of φ¾-inch carbon steel balls, and subjected to hydrolysis by dry grinding for 24 hours under conditions with a total amplitude of 8 mm, a vibrational frequency of 16.2 Hz and a jacket circulation water temperature of 75° C., after which the reaction powder was recovered.

After then placing 10 g of the reaction powder and 90 g of ion-exchanged water in a 200 L beaker, a magnetic stirrer was used for 1 hour of stirring at 25° C. to obtain a cellulose hydrolysate extract.

Next, 1.3 g of a 40 mass % aqueous calcium hydroxide solution was added to the extract, and a magnetic stirrer was used for 1 hour of stirring at 25° C. to prepare a neutral solution, collecting the supernatant using a centrifuge apparatus and freeze-drying it to obtain cellooligosaccharide powder.

(3) Xylooligosaccharide

The xylooligosaccharides listed below under "Commercial product" were used in Examples 1 and 2 and Comparative Examples 1 and 4, and the xylooligosaccharides produced by "Production method" were used in Examples 6 to 9 and 11.

(Production Method: From Corn Cob Powder)

*Acremonium cellulolyticus* TN (FERM P-18508) was shake cultured for 6 days at 30° C. in a 500 mL flask containing 100 mL of liquid medium (50 g/L AVICEL, 24 g/L $KH_2O_4$, 5 g/L ammonium sulfate, 4.7 g/L potassium tartrate $1/2H_2O$, 4 g/L urea, 1 g/L Tween80, 1.2 g/L $MgSO_4.7H_2O$, 10 mg/L $ZnSO_4.7H_2O$, 10 mg/L $MnSO_4.5H_2O$, 10 mg/L $CuSO_4.5H_2O$), and then 5 g of corn cob powder suspended in 50 mL of centrifuged supernatant of the obtained culture solution was stirred and reacted at 50° C. for 72 hr, and the centrifuged supernatant of the reaction mixture was freeze-dried to obtain xylooligosaccharide powder.

(Commercial Product)

Xylooligosaccharide 95P by B Food Science Co., Ltd. was used.

[2. Preparation of Amino Acids]
(1) Glycine: Showa Denko K.K.
(2) Lysine: FujiFilm-Wako Pure Chemical Industries
(3) Sodium glutamate (MSG): FujiFilm-Wako Pure Chemical Industries
(4) Histidine: FujiFilm-Wako Pure Chemical Industries
(5) Alanine: FujiFilm-Wako Pure Chemical Industries
(6) Arginine: FujiFilm-Wako Pure Chemical Industries

[3. Measuring Root Dry Weight of Frill Lettuce]
(1) Preparation of Plant Vitalizer Each oligosaccharide prepared in [1. Preparation of oligosaccharide] and each amino acid prepared in [2. Preparation of amino acids] were dissolved in water while stirring with a stirrer in a compositional ratio to 1000 times the plant vitalizer concentration (ppm by mass) in Comparative Examples 1 and 2 and Examples 1 and 6 to 7 listed in the tables, after which the bacteria were removed with a 0.45 μm filter, to obtain plant vitalizer stock solutions.

(2) Cultivation Test

In the test groups, 150 g of each of the plant vitalizer stock solutions under different conditions was added to and dispersed in 150 L of culture solution prepared for hydroponics (1000-fold dilution), and cultivation was started for each of 120 varieties at a temperature of 20 to 22° C. Cultivation was carried out for a total of 60 days, with a total of 5 times every week after beginning further addition of 150 g of plant vitalizer stock solution, and the root dry weights of the frill lettuce were measured.

The root dry weights were determined by cutting the root parts, drying the cut roots with a constant temperature dryer for 12 hours at 50° C., and then measuring the weights.

The root dry weights in Table 1 are percentages (%) with respect to 100% as the root dry weight in the non-added group without plant vitalizer addition.

TABLE 1

|  |  |  |  | Comparative Example 1 | Example 1 | Example 6 | Example 7 | Comparative Example 2 |
|---|---|---|---|---|---|---|---|---|
| Conditions | Plant vitalizer concentration (ppm by mass) |  |  | 50 | 100 | 100 | 100 | 50 |
|  | Compositional ratio | Exogenous elicitor | Chitin oligo-saccharide | 17 ppm 33% | 17 ppm 17% | 20 ppm 20% | 20 ppm 20% | — |
|  |  | Endogenous elicitor | Cellooligosaccharide | 17 ppm 33% | 17 ppm 17% | 20 ppm 20% | — | — |
|  |  |  | Xylooligosaccharide | 17 ppm 33% | 17 ppm 17% | 40 ppm 40% | 60 ppm 60% | — |
|  |  | Other | Glycine | — | 50 ppm 50% | 20 ppm 20% | 20 ppm 20% | 50 ppm 100% |
| Results | Increase in root dry weight with respect to non-added group (measured n = 5) |  |  | 109% | 119% | 126% | 123% | 112% |

[4. Evaluation of Komatsuna Elicitor Activity]

(1) Preparation of Plant Vitalizer

Each oligosaccharide prepared in [1. Preparation of oligosaccharide] and each amino acid prepared in [2. Preparation of amino acids] were dissolved in water while stirring with a stirrer in a compositional ratio to 1000 times the plant vitalizer concentration (ppm by mass) in Comparative Examples 4 to 10 and Examples 2, 8 and 9 listed in the tables, after which the bacteria were removed with a 0.45 μm filter, to obtain plant vitalizer stock solutions. Each stock solution was diluted 1000-fold with water and used for the following cultivation test.

(2) Preparation of MS Medium

Murashige and Skoog (MS) agar medium was used for raising of the komatsuna. The prepared plant vitalizers were added to the MS medium to the final concentrations indicated for each of the Examples and Comparative Examples, and then autoclaved for 20 minutes at 121° C.

(3) Seeding and Growing Method

High-pressure steam sterilized MS medium was transferred into a plant box on a clean bench and thoroughly cooled, and then komatsuna ("Wakami", Sakata Seed Corp.) were seeded in a count of 10 each. They were then grown for 6 days with long-day conditions of 24 hours in a lighted room at 22° C.

(4) Protein Extraction

A protein extraction buffer with the following composition was prepared.

TABLE 2

Protein extraction buffer

| Reagent name | Volume (mol) | Remark |
|---|---|---|
| 0.2M Phosphate buffer (pH 6.0) | 1.25 ml |  |
| 5.0M NaCl | 0.3 ml (150 mM) |  |
| 0.5M EDTA2Na | 20 μl (1 mM) |  |
| 60% Glycerol | 1.7 ml | May be 99-100% purity product |
| Triton X-100 | 0.1 ml | Surfactant |
| 1M DTT | 10 μl (1 mM) |  |
| 25 x Protease inhibitor | 0.4 ml | 1 Tablet/2 ml H$_2$O |
| H$_2$O | 6.22 ml | Ultrapure water |
| Total | 10 ml |  |

After adding 300 μl of the prepared protein extraction buffer into a 1.5 ml tube equipped with a Biomasher (Nippi, Inc.), leaves (plant body) sampled and cut with scissors to approximately 4×4 mm were added. The procedure was carried out 5 times for each sample. A stirring rod was then rotated by hand to break up the plant body until the solid portion was generally no longer visible. Centrifugal separation was carried out under conditions of 15,000×g, 10 minutes, 4° C., and the aqueous layer was collected into a fresh 1.5 ml tube to prepare a liquid extract.

(5) Adjustment of Protein Concentration

A 2 mg/ml portion of bovine serum albumin (BSA) of known purity was serially diluted (1/2, 1/4, 1/8, 1/16, 1/32 and 1/64 dilution) to prepare standards. The prepared standards were used to determine the average absorbance at 600 nm (Abs600), and a calibration curve was drawn (n=3). After injecting 300 μl of Coomassie Brilliant Blue (CBB) solution into a 96-well plate, 6 μl of the prepared liquid extract was added. The Abs600 was then measured. The blank used was MilliQ. The absorbance of the liquid extract was fitted onto the calibration curve drawn with the 2 mg/ml of serially diluted BSA, to determine the protein concentration.

When the measured Abs600 value of the liquid extract fell outside of the calibration curve, it was measured again with appropriate dilution using ultrapure water (MilliQ) to determine the protein concentration.

Dilution was carried out to a constant liquid extract concentration using the determined values, and the diluted extract was used for the following glucanase activity measurement.

(6) Glucanase Activity Measurement

In a 1.5 ml tube there were mixed 100 μl of a B-HS substrate solution prepared by suspending one tablet of B-HS reagent (Megazyme Co.) in 10 ml of MilliQ, 50 μl of 0.2 M phosphate buffer solution (pH 6.0) and 50 μl of the previously prepared diluted solution or ultrapure water (blank), to prepare samples for each of the Comparative Examples and Examples. Enzyme reaction was conducted for 1 hour and 30 minutes in a water bath at 30° C., shaking the sample well every 15 minutes. A 100 μl portion of 0.2 N NaOH as reaction stop solution (total: 300 μl) was added to stop the reaction. Centrifugal separation was carried out under conditions of 15,000 rpm, 5 minutes, 200 μl of the supernatant was dispensed into a 96-well plate, and the absorbance at 590 nm (Abs590) was measured to evaluate the glucanase activity, comparing it with the same without application of the plant vitalizer (Comparative Example 3).

TABLE 3-1

|  |  |  |  | Example 2 | Example 8 | Example 9 | Comparative Example 3 | Comparative Example 4 | Comparative Example 5 |
|---|---|---|---|---|---|---|---|---|---|
| Conditions | Plant vitalizer concentration (ppm by mass) |  |  | 100 | 100 | 100 | 0 | 50 | 750 (10 mM) |
|  | Compositional ratio | Exogenous elicitor | Chitin oligosaccharide | 17 ppm | 20 ppm | 20 ppm | — | 17 ppm | — |
|  |  | Endogenous elicitor | Cellooligosaccharide | 17 ppm | 20 ppm | — | — | 17 ppm | — |
|  |  |  | Xylooligosaccharide | 17 ppm | 40 ppm | 60 ppm | — | 17 ppm | — |
|  |  | Other | Glycine | 50 ppm (50%) | 20 ppm (20%) | 20 ppm (20%) | — | — | 750 ppm (100%) |
|  |  |  | Lysine | — | — | — | — | — | — |
|  |  |  | MSG | — | — | — | — | — | — |
|  |  |  | Histidine | — | — | — | — | — | — |
|  |  |  | Alanine | — | — | — | — | — | — |
|  |  |  | Arginine | — | — | — | — | — | — |
| Results | Elicitor activity (compared to control as 100) |  |  | 412 | 380 | 375 | 100 | 310 | 141 |

TABLE 3-2

|  |  |  |  | Comparative Example 6 | Comparative Example 7 | Comparative Example 8 | Comparative Example 9 | Comparative Example 10 |
|---|---|---|---|---|---|---|---|---|
| Conditions | Plant vitalizer concentration (ppm by mass) |  |  | 1460 (10 mM) | 1690 (10 mM) | 1550 (10 mM) | 890 (10 mM) | 1740 (10 mM) |
|  | Compositional ratio | Exogenous elicitor | Chitin oligosaccharide | — | — | — | — | — |
|  |  | Endogenous elicitor | Cellooligosaccharide | — | — | — | — | — |
|  |  |  | Xylooligosaccharide | — | — | — | — | — |
|  |  | Other | Glycine | — | — | — | — | — |
|  |  |  | Lysine | 1460 ppm (100%) | — | — | — | — |
|  |  |  | MSG | — | 1690 ppm (100%) | — | — | — |
|  |  |  | Histidine | — | — | 1550 ppm (100%) | — | — |
|  |  |  | Alanine | — | — | — | 890 ppm (100%) | — |
|  |  |  | Arginine | — | — | — | — | 1740 ppm (100%) |
| Results | Elicitor activity (compared to control as 100) |  |  | 104 | 82 | 89 | 72 | 79 |

[5. Measurement of Komatsuna Fresh Weight]
(1) Preparation of Plant Vitalizer

Each oligosaccharide prepared in [1. Preparation of oligosaccharide] and each amino acid prepared in [2. Preparation of amino acids] were dissolved in water while stirring with a stirrer in a compositional ratio to 1000 times the plant vitalizer concentration (ppm by mass) in Comparative Examples 12 to 14 and Examples 3 to 5, 10 and 11 listed in the tables, after which the bacteria were removed with a 0.45 μm filter, to obtain plant vitalizer stock solutions. Each stock solution was diluted 1000-fold with water and used for the following cultivation test.

(2) Measurement of Fresh Weight

A sample was prepared with komatsuna (Wakami, Sakata Seed Corp.) as the plant crop, organic vegetable soil (Hirota Shoten) as the soil and Shin-Taki Organic Liquid Fertilizer #3 (Taki Chemical Co., Ltd.) as the fertilizer.

After sprouting the plants on filter paper, they were planted into a 25-hole connected pot (280×280 mm overall, with holes of 50×50×50 mm) containing culturing soil and fertilizer. After raising the komatsuna for 34 days in a culture chamber while applying each plant vitalizer to the leaves at one-week intervals after planting, the fresh weights were measured and compared with the same without application of plant vitalizer (Comparative Example 11).

TABLE 4

|  |  |  |  | Comparative Example 11 | Example 3 | Example 10 | Example 11 | Comparative Example 12 | Comparative Example 13 | Comparative Example 14 | Example 4 | Example 5 |
|---|---|---|---|---|---|---|---|---|---|---|---|---|
| Conditions | Plant vitalizer concentration (ppm by mass) |  |  | 0 | 380 | 380 | 380 | 1550 | 750 | 1690 | 780 | 850 |
|  | Compositional ratio | Exogenous elicitor | Chitin oligosaccharide | — | 5 ppm | — | — | — | — | — | 5 ppm | 5 ppm |
|  |  | Endogenous elicitor | Cellooligosaccharide | — | — | 5 ppm | — | — | — | — | — | — |
|  |  |  | Xylooligosaccharide | — | — | — | 5 ppm | — | — | — | — | — |

TABLE 4-continued

| | | Comparative Example 11 | Example 3 | Example 10 | Example 11 | Comparative Example 12 | Comparative Example 13 | Comparative Example 14 | Example 4 | Example 5 |
|---|---|---|---|---|---|---|---|---|---|---|
| | Other Glycine | — | 375 ppm (5 mM) | 375 ppm (5 mM) | 375 ppm (5 mM) | — | 750 ppm (10 mM) | — | — | — |
| | Histidine | — | — | — | — | 1550 ppm (10 mM) | — | — | 775 ppm (5 mM) | — |
| | MSG | — | — | — | — | — | — | 1690 ppm (10 mM) | — | 845 ppm (5 mM) |
| Results | Fresh weight (compared to control as 100) | 100% | 121% | 116% | 112% | 92% | 102% | 89% | 107% | 103% |

The invention claimed is:

1. A plant vitalizer comprising:
at least one amino acid or its salt, wherein the at least one amino acid is glycine;
a chitin oligosaccharide; and
at least one oligosaccharide selected from the group consisting of a cellooligosaccharide and a xylooligosaccharide,
wherein the chitin oligosaccharide and the at least one oligosaccharide are the only oligosaccharides in the plant vitalizer, and
the total content of the chitin oligosaccharide and the at least one oligosaccharide in the plant vitalizer is 5 to 10 mass %,
wherein the chitin oligosaccharide is a chemically or enzymatically modified chitin, and
wherein the chitin oligosaccharide comprises a compound of

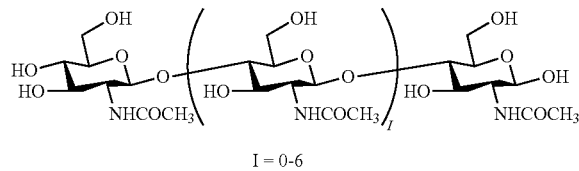

I = 0-6 wherein some of acetyl groups (COCH$_3$) of the compound are shed, leaving NH$_2$ groups, and a percentage of deacetylation is no greater than 30% of a total chitin oligosaccharide.

2. The plant vitalizer according to claim 1, wherein the at least one oligosaccharide is a cellooligosaccharide and a xylooligosaccharide.

3. The plant vitalizer according to claim 1, wherein the total content of the at least one amino acid or its salt in the plant vitalizer is 2.5 to 30 mass %.

4. The plant vitalizer according to claim 1, which further comprises a spreading agent.

5. The plant vitalizer according to claim 1, consisting of the at last one amino acid or its salt;
the chitin oligosaccharide
the at least one oligosaccharide; and
water.

6. The plant vitalizer according to claim 1, consisting of the at last one amino acid or its salt;
the chitin oligosaccharide;
the at least one oligosaccharide;
water; and
at least one additive selected from the group consisting of an antiseptic agent, a spreading agent, an anti-settling agent, a thickener and a filler.

7. The plant vitalizer according to claim 1, wherein the cellooligosaccharide is a cellooligosaccharide that comprises oligomers with a glucose polymerization degree of 3 to 6.

8. A plant cultivation method, which comprises applying the plant vitalizer according to claim 1 to a plant.

9. The method according to claim 8, which comprises applying the plant vitalizer to a plant at a concentration so that the total content of the chitin oligosaccharide and the at least one oligosaccharide is 0.1 to 500 ppm by mass.

10. The method according to claim 8, wherein the plant vitalizer is applied to the plant by foliar application.

11. The method according to claim 8, which comprises applying the plant vitalizer to a plant at a concentration so that the total content of the oligosaccharide is 0.1 to 100 ppm by mass.

12. A method of producing a plant or a part thereof having increased elicitor activity compared to the same without application of the plant vitalizer according to claim 1, wherein the method comprises cultivating the plant or part hereof by applying the plant vitalizer to the plant or the part thereof.

13. The method according to claim 12, wherein the elicitor activity is determined by measuring glucanase production in the plant.

14. A fertilizer composition comprising:
a plant vitalizer according to claim 1; and
water.

* * * * *